United States Patent
Demetriades et al.

(10) Patent No.: US 10,204,520 B2
(45) Date of Patent: Feb. 12, 2019

(54) UNMANNED AERIAL VEHICLE BASED SECURITY SYSTEM

(71) Applicants: Orestis Demetriades, Massapequa Park, NY (US); Vitalijs Bondarenko, Valodzes (LV)

(72) Inventors: Orestis Demetriades, Massapequa Park, NY (US); Vitalijs Bondarenko, Valodzes (LV)

(*) Notice: Subject to any disclaimer, the term of this patent is extended or adjusted under 35 U.S.C. 154(b) by 154 days.

(21) Appl. No.: 15/473,680

(22) Filed: Mar. 30, 2017

(65) Prior Publication Data

US 2017/0330466 A1 Nov. 16, 2017

Related U.S. Application Data

(60) Provisional application No. 62/336,759, filed on May 16, 2016.

(51) Int. Cl.
| | |
|---|---|
| *G08G 5/00* | (2006.01) |
| *B64C 39/02* | (2006.01) |
| *H04W 4/40* | (2018.01) |
| *G08B 13/196* | (2006.01) |
| *G05D 1/00* | (2006.01) |
| *H04L 29/08* | (2006.01) |

(52) U.S. Cl.
CPC ......... *G08G 5/0034* (2013.01); *B64C 39/024* (2013.01); *G05D 1/0094* (2013.01); *G08B 13/1965* (2013.01); *G08G 5/0013* (2013.01); *G08G 5/0069* (2013.01); *G08G 5/0086* (2013.01); *H04W 4/40* (2018.02); *B64C 2201/127* (2013.01); *B64C 2201/146* (2013.01); *G08B 13/19613* (2013.01); *G08B 13/19695* (2013.01); *H04L 67/12* (2013.01)

(58) Field of Classification Search
CPC .. G08G 5/0034; G08G 5/0013; G08G 5/0069; G08G 5/0086; G08B 13/1965; G08B 13/19695; G08B 13/19613; G05D 1/0094; H04W 4/40; H04L 67/12; B64C 39/024; B64C 2201/127

See application file for complete search history.

(56) References Cited

U.S. PATENT DOCUMENTS

| | | | | |
|---|---|---|---|---|
| 2011/0099371 A1* | 4/2011 | Roy | ............ | H04L 63/0823 713/168 |
| 2016/0266577 A1* | 9/2016 | Kerzner | ............ | G05D 1/0022 |

* cited by examiner

*Primary Examiner* — Mary Cheung
(74) *Attorney, Agent, or Firm* — LegalForce RAPC Worldwide

(57) ABSTRACT

A method includes defining a flight plan of an unmanned aerial vehicle from a rest location thereof to a destination location within a memory of the unmanned aerial vehicle, and capturing, through one or more sensor(s) communicatively coupled to the unmanned aerial vehicle and a server through a computer network, data related to an environment of a specific location covered by the one or more sensor(s). The method also includes detecting, through a processor associated with the one or more sensor(s) and/or the server, a security breach and/or a security threat at the specific location based on analyzing the captured data, and automatically activating, through the one or more sensor(s) or the server, the flight plan on the unmanned aerial vehicle in response to the detection of the security breach and/or the security threat to dispatch the unmanned aerial vehicle to perform additional surveillance of the specific location.

20 Claims, 7 Drawing Sheets

UNMANNED AERIAL VEHICLE BASED SECURITY SYSTEM

CLAIM OF PRIORITY

This non-provisional patent application is a conversion application of and claims priority to the U.S. Provisional Patent application No. 62/336,759 titled "UNMANNED AERIAL VEHICLE VERIFICATION OF VIDEO MANAGEMENT SYSTEM DETECTED ALARM EVENTS" filed on May 16, 2016.

FIELD OF TECHNOLOGY

This disclosure relates generally to security systems, and more particularly, to a method, a device and/or a system of unmanned aerial vehicle based security.

BACKGROUND

Video Management System (VMS) software may frequently be used to monitor security in predefined area(s). In some situations, surveillance cameras may communicate video feeds of the predefined area(s) to a VMS server. In other situations, surveillance sensors may transmit event-based alarm signals to the VMS server. Typically, security systems using VMS software utilize stationary cameras and/or sensors. The stationary surveillance camera(s) and/or the surveillance sensor(s) may transmit the video feed(s) and/or the event-based alarm signal(s) to the VMS server, which then determines whether a security breach and/or a security threat has occurred.

In certain implementations, the surveillance camera(s) and/or the surveillance sensor(s) may directly transmit the occurrence of an alarm event to the VMS server. However, the surveillance camera(s) and/or the surveillance sensors may have predefined monitoring capabilities that cannot be altered once an alarm event is detected. A standard surveillance camera may be able to zoom in to get a closer look; however, the surveillance camera may not be capable of altering the preset field of view to capture activity just outside of range.

As such, in present systems, once the alarm event is identified, the VMS server may alert security personnel to respond to the alarm event to identify whether there is a valid alarm event (e.g., the security breach and/or the security threat discussed above), such as an intruder being on the premises of a predefined area. In many instances, personnel may be dispatched to the predefined area only to determine that the alarm event is not valid; the alarm event may have been triggered by a malfunction in the system and/or a non-emergent element such as an animal.

Dispatching personnel may involve high expenditure of time and money. Thus, traditional VMS systems using only stationary surveillance cameras and/or sensors may unnecessarily waste time and money in dispatching personnel to every identified alarm event and/or present an unnecessary risk of harm to said dispatched personnel.

SUMMARY

Disclosed are a method, a system and/or a device of unmanned aerial vehicle based security.

In one aspect, a method includes defining one or more flight plan(s) of an unmanned aerial vehicle from a rest location thereof to a destination location within a memory of the unmanned aerial vehicle based on accessing an Application Programming Interface (API) exposed through a programming toolkit executing on a processor of the unmanned aerial vehicle. A flight plan of the one or more flight plan(s) is a sequence of operations to be performed by the unmanned aerial vehicle as part of dispatch thereof to the destination location.

The method also includes capturing, through one or more sensor(s) communicatively coupled to the unmanned aerial vehicle and a server through a computer network, data related to an environment of a specific location covered by the one or more sensor(s), detecting, through a processor associated with the one or more sensor(s) and/or the server, a security breach and/or a security threat at the specific location based on analyzing the captured data, and automatically activating, through the one or more sensor(s) or the server, the flight plan of the one or more flight plan(s) on the unmanned aerial vehicle in response to the detection of the security breach and/or the security threat at the specific location.

The server is at a location remote from the one or more sensor(s). Further, the method includes executing, through the unmanned aerial vehicle, the sequence of operations defined in the flight plan to dispatch the unmanned aerial vehicle to perform additional surveillance of the specific location with regard to the detected security breach and/or the security threat in accordance with interpretation of the specific location as the destination location of the unmanned aerial vehicle and the automatic activation of the flight plan on the unmanned aerial vehicle.

In another aspect, a server includes a memory, and a processor communicatively coupled to the memory. The processor is configured to execute instructions to define one or more flight plan(s) of an unmanned aerial vehicle from a rest location thereof to a destination location within a memory of the unmanned aerial vehicle based on accessing an API exposed through a programming toolkit executing on a processor of the unmanned aerial vehicle. A flight plan of the one or more flight plan(s) is a sequence of operations to be performed by the unmanned aerial vehicle as part of dispatch thereof to the destination location.

The processor is also configured to execute instructions to detect a security breach and/or a security threat at a specific location based on analyzing data captured through one or more sensor(s) communicatively coupled to the unmanned aerial vehicle and the server through a computer network, and to automatically activate the flight plan of the one or more flight plan(s) on the unmanned aerial vehicle in response to the detection of the security breach and/or the security threat at the specific location. The captured data is related to an environment of the specific location covered by the one or more sensor(s), and the server is at a location remote from the one or more sensor(s).

Further, the processor is configured to execute instructions to dispatch the unmanned aerial vehicle to the specific location to perform additional surveillance thereat with regard to the detected security breach and/or the security threat based on execution of the flight plan on the unmanned aerial vehicle in accordance with interpretation of the specific location as the destination location of the unmanned aerial vehicle and the automatic activation of the flight plan on the unmanned aerial vehicle.

In yet another aspect, a system includes an unmanned aerial vehicle having one or more flight plan(s) from a rest location thereof to a destination location defined within a memory of the unmanned aerial vehicle based on access to an API exposed through a programming toolkit executing on a processor of the unmanned aerial vehicle. A flight plan of the one or more flight plan(s) is a sequence of operations to be performed by the unmanned aerial vehicle as part of dispatch thereof to the destination location. The system also includes a server, and one or more sensor(s) communicatively coupled to the unmanned aerial vehicle and the server through a computer network to capture data related to an environment of a specific location covered by the one or more sensor(s).

The server is at a location remote from the one or more sensor(s). Further, the system includes a processor associated with the one or more sensor(s) and/or the server to detect a security breach and/or a security threat at the specific location based on analyzing the captured data. The one or more sensor(s) or the server is configured to automatically activate the flight plan of the one or more flight plan(s) on the unmanned aerial vehicle in response to the detection of the security breach and/or the security threat at the specific location, and the unmanned aerial vehicle is configured to execute the sequence of operations defined in the flight plan to dispatch the unmanned aerial vehicle to perform additional surveillance of the specific location with regard to the detected security breach and/or the security threat in accordance with interpretation of the specific location as the destination location of the unmanned aerial vehicle and the automatic activation of the flight plan on the unmanned aerial vehicle.

The methods and systems disclosed herein may be implemented in any means for achieving various aspects, and may be executed in a form of a machine-readable medium embodying a set of instructions that, when executed by a machine, causes the machine to perform any of the operations disclosed herein. Other features will be apparent from the accompanying drawings and from the detailed description that follows.

BRIEF DESCRIPTION OF THE DRAWINGS

The embodiments of this disclosure are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide unmanned aerial vehicle based security. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

Figure 1:
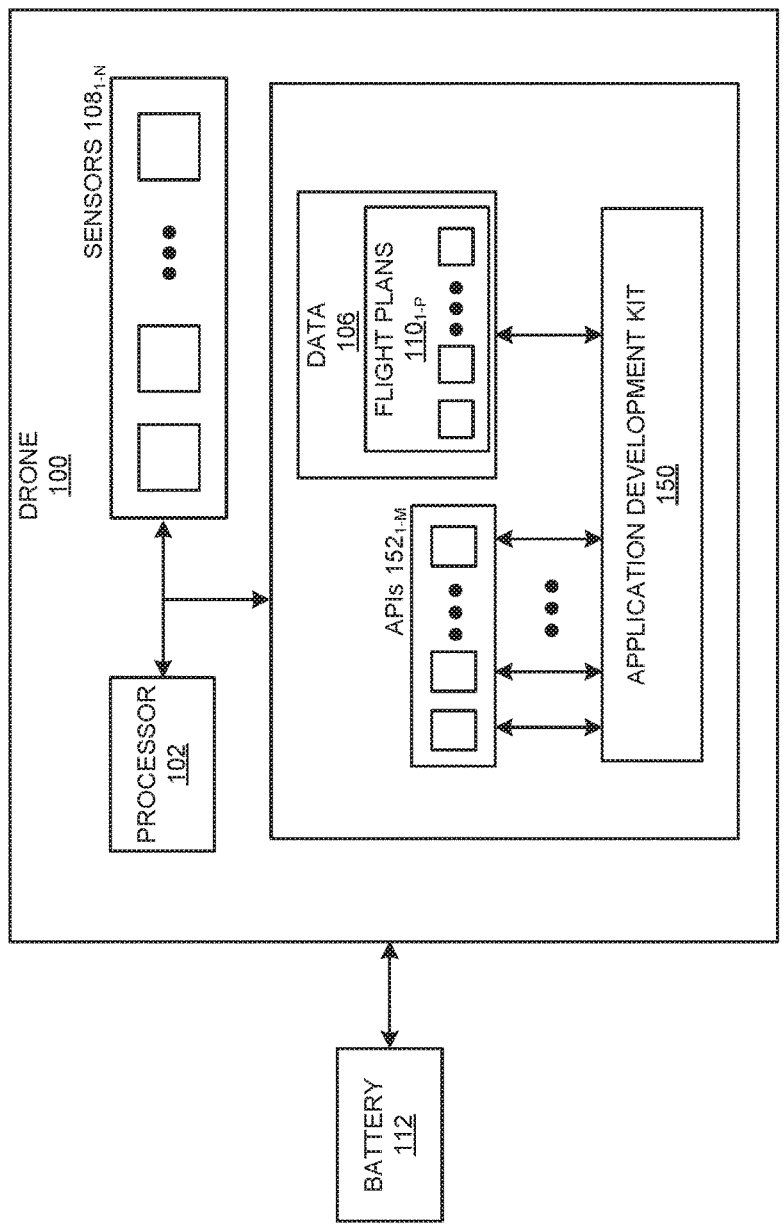
FIG. 1 is a schematic view of a drone, according to one or more embodiments.

FIG. 1 shows a block diagram of a drone 100, according to one or more embodiments. In one or more embodiments, drone 100 may include a processor 102 (e.g., a microprocessor, a microcontroller) communicatively coupled to a memory 104 (e.g., a non-volatile memory and/or a volatile memory); memory 104 may include instructions related to an application development kit 150 stored therein. In one or more embodiments, application development kit 150 may include several modules configured to enable several functionalities, at least some of which are discussed below. In one or more embodiments, application development kit 150 may expose one or more application programming interfaces (APIs) $152_{1-M}$ that enable external parties (e.g., a software developer) to access data from and/or program drone 100.

FIG. 1 shows data 106 stored in memory 104; said data 106 may be associated with application development kit 150, and may be generated through drone 100 by one or more sensors $108_{1-N}$ provided therein. Example sensors $108_{1-N}$ may include an image/video sensor such as a video camera, an audio sensor and so on; other sensors $108_{1-N}$ are within the scope of the exemplary embodiments discussed herein; sensors $108_{1-N}$ have been shown to be interfaced with application development kit 150 by way of being interfaced with processor 102. To clarify, application development kit 150 may execute on processor 102 during operation of drone 100, and sensors $108_{1-N}$, in conjunction with processor 102, may sense data to be stored as part of data 106 based on the capabilities provided through application development kit 150.

In one or more embodiments, data 106 may include flight plans $110_{1-P}$, each of which includes a sequence of operations to be performed by drone 100 (to be discussed below). In one or more embodiments, the aforementioned flight plans $110_{1-P}$ may be configured through the exposed APIs $152_{1-M}$. In one or more embodiments, drone 100 may be powered through a battery 112. Battery 112 may be understood to be one battery configured to power all components of drone 100 or a number of batteries, each of which is configured to power one or more components of drone 100.

Figure 2:
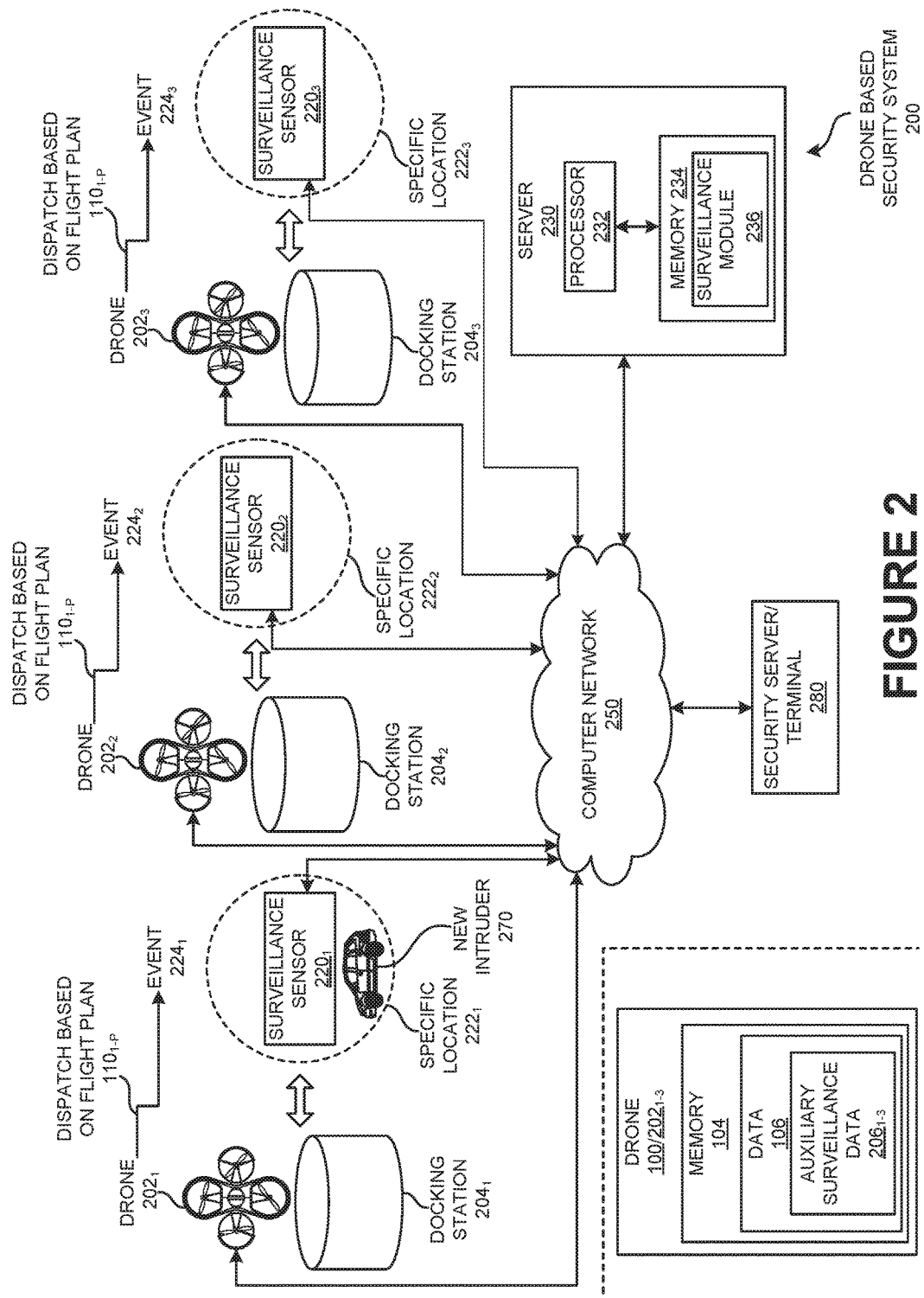
FIG. 2 is a schematic view of a drone based security system, according to one or more embodiments.

FIG. 2 shows a drone based security system 200, according to one or more embodiments. In one or more embodiments, drone based security system 200 may include a number of drones (e.g., three drones $202_{1-3}$ shown for illustrative purposes) at respective docking stations (e.g., docking stations $204_{1-3}$) thereof. A docking station $204_{1-3}$ may be a platform on which a drone $202_{1-3}$ is located when not in use. Each of drones $202_{1-3}$ may be analogous to drone 100. Docking station $204_{1-3}$ may be used to recharge a battery of drone $202_{1-3}$ (see battery 112) during docking thereof. Each docking station $204_{1-3}$ may be equipped with a locking mechanism (e.g., a magnetic system; not shown) that helps secure the associated drone $202_{1-3}$ thereto when not in use. For example, if the location of drone $202_{1-3}$ and/or the associated docking station $204_{1-3}$ is experiencing high winds, the locking mechanism may prevent drone $202_{1-3}$ from being displaced from the associated docking station $204_{1-3}$.

In one or more embodiments, each drone $202_{1-3}$ may be communicatively coupled to a server 230 (e.g., a remote terminal) through a computer network 250 (e.g., a Local Area Network (LAN), a Wide Area Network (WAN), Internet and/or a short range network). FIG. 2 shows server 230 as including a processor 232 communicatively coupled to a memory 234. In one or more embodiments, memory 234 may include a surveillance module 236 configured to be executable through processor 232. In one or more embodiments, the aforementioned surveillance module 236 may offer capabilities to control drones $202_{1-3}$ from a location of server 230 and receive inputs from drones $202_{1-3}$.

In one or more embodiments, configuration of each drone $202_{1-3}$ with flight plans (e.g., flight plans $110_{1-P}$) may be done through server 230 (e.g., via APIs $152_{1-M}$). Alternately, configuration of the each drone $202_{1-3}$ with flight plans $110_{1-P}$ may be directly done through the application development kit (e.g., application development kit 150) therein via the exposed APIs (e.g., APIs $152_{1-M}$). In one or more embodiments, drone based security system 200 may include a number of surveillance sensors (e.g., surveillance sensors $220_{1-3}$) communicatively coupled to server 230 through computer network 250.

Again, in one or more embodiments, server 230 may be provided with a capability to control surveillance sensors $220_{1-3}$ and receive inputs therefrom. In one or more embodiments, each surveillance sensor $220_{1-3}$ may cover a specific location $222_{1-3}$ within drone based security system 200. For example, each of surveillance sensors $220_{1-3}$ may cover a specific driveway of a building. Here, each surveillance sensor $220_{1-3}$ may be a motorized video camera configured to be controllable through server 230. The motorized video cameras may be controlled through server 230 (at a location remote from those of surveillance sensors $220_{1-3}$) to turn around, zoom in and focus on the specific driveways (or, even more specific portions thereof).

In one or more embodiments, each surveillance sensor $220_{1-3}$ may be configured to detect events (e.g., event $224_{1-3}$) based on focusing on the specific location $222_{1-3}$ associated therewith. For example, a motorized video camera (an example surveillance sensor $220_{1-3}$) may detect motion of a car coming into the driveway based on continuously capturing images/video frames and detecting changes in pixels/macroblocks thereof; the detection may, alternately or additionally, be performed in conjunction with server 230. The detection of the motion of the car may constitute an event $224_{1-3}$.

It should be noted that detection of motion may not merely be limited to utilization of motorized video cameras and image/video frame analyses. It should be noted that detection of motion may encompass radiation (e.g., electromagnetic, heat) scattering from obstacles (e.g., incoming cars) and audio detection. Further, it should be noted that each surveillance sensor $220_{1-3}$ may merely detect presence of a new intruder (e.g., incoming car; new intruder 270 is shown in FIG. 2 in specific location $222_1$) based on detection of audio levels and/or capture of images/videos thereof, and the detection of the presence may itself constitute an event $224_{1-3}$.

In one or more embodiments, each drone $202_{1-3}$ may be communicatively coupled to the corresponding each surveillance sensor $220_{1-3}$ through computer network 250. For example, each surveillance sensor $220_{1-3}$ may communicate with the corresponding each drone $202_{1-3}$ based on WiFi® or Bluetooth® protocols; each of the aforementioned surveillance sensors $220_{1-3}$ and/or drones $202_{1-3}$ may also communicate with server 230 based on the aforementioned protocols. In certain embodiments, each surveillance sensor $220_{1-3}$ may be communicatively coupled to all drones $202_{1-3}$ for purposes to be discussed below.

In one or more embodiments, as discussed above, each drone $202_{1-3}$ may have a set of flight plans (e.g., flight plans $110_{1-P}$) stored therein. Each flight plan $110_{1-P}$ may clearly describe a sequence of operations to be performed by a drone $202_{1-3}$ in response to detection of an event $224_{1-3}$ discussed above by a corresponding surveillance sensor $220_{1-3}$. Drone $202_{1-3}$ may be in a standby mode thereof at the corresponding docking station $204_{1-3}$; following the detection of event $224_{1-3}$, drone $202_{1-3}$ may be transitioned into an active mode of flight to be dispatched to the corresponding specific location $222_{1-3}$.

Figure 3:
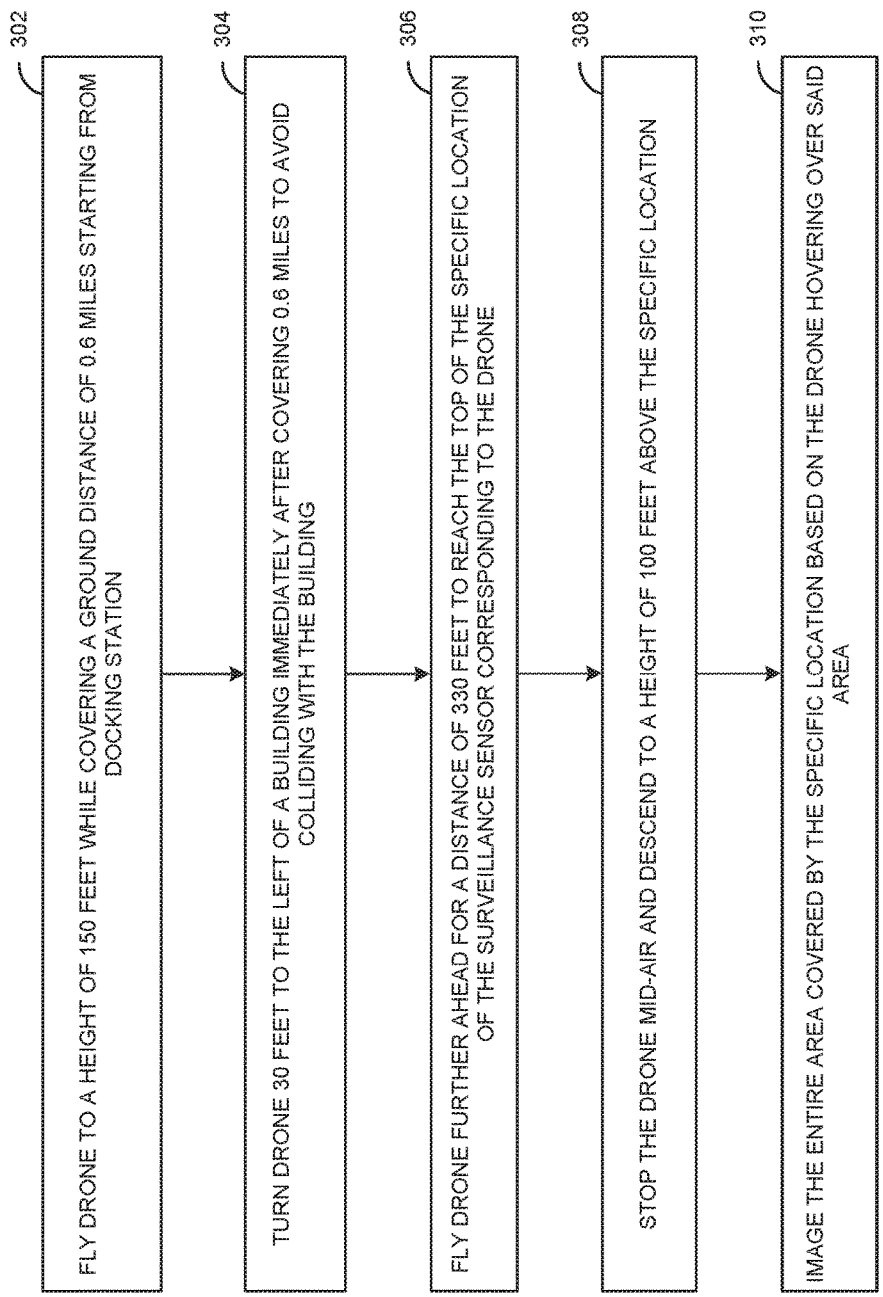
FIG. 3 is an example sequence of operations to be performed by a drone of FIGS. 1-2 as part of a flight plan.

FIG. 3 shows an example sequence of operations to be performed by a drone $202_{1-3}$ as part of a flight plan $110_{1-P}$. Operation 302 may involve drone $202_{1-3}$ flying to a height of 150 feet while covering a ground distance of 0.6 miles starting from the corresponding docking station $204_{1-3}$. Operation 304 may involve turning 30 feet to the left of a building (an example obstacle) immediately after covering 0.6 miles to avoid colliding with the building. Operation 306 may involve flying further ahead for a distance of 330 feet to reach the top of the specific location $222_{1-3}$ of the surveillance sensor $220_{1-3}$ corresponding to drone $202_{1-3}$.

Operation 308 may involve drone $202_{1-3}$ stopping mid-air and descending to a height of 100 feet above the specific location $222_{1-3}$. Operation 310 may then involve imaging the entire area covered by the specific location $222_{1-3}$ based on drone $202_{1-3}$ hovering over said area utilizing the onboard sensors $108_{1-N}$ to generate auxiliary surveillance data $206_{1-3}$ in conjunction with a processor (e.g., processor 102) thereof. FIG. 2 shows auxiliary surveillance data $206_{1-3}$ as part of data 106 of an example drone $202_{1-3}$/100.

In one or more embodiments, the detection of event $224_{1-3}$ by surveillance sensor $220_{1-3}$ may trigger an appropriate communication therefrom to the associated drone $202_{1-3}$. For the aforementioned purpose, server 230 (or, an external party, a user) may configure drone $202_{1-3}$ and the associated surveillance sensor $220_{1-3}$ to communicate with one another through computer network 250; in some preferred embodiments, said computer network 250 may enable short-range communication (e.g., based on WiFi®, Bluetooth®) between drone $202_{1-3}$ and the associated surveillance sensor $220_{1-3}$.

It should be noted that it may not be required of the associated surveillance sensor $220_{1-3}$ and drone $202_{1-3}$ to directly communicate with one another. In some alternate embodiments, the associated surveillance sensor $220_{1-3}$ may communicate detection of event $224_{1-3}$ to server 230, following which server 230 activates the relevant flight plan $110_{1-P}$ on drone $202_{1-3}$; again, communication between server 230 and drone $202_{1-3}$ may be through computer network 250 (e.g., LAN, WAN, short-range network). As discussed above, the activation of flight plan $110_{1-P}$ may trigger flight of drone $202_{1-3}$ to the specific location $222_{1-3}$ to perform additional surveillance.

The non-intrusiveness/non-invasiveness of drone $202_{1-3}$ may enable the additional surveillance to be performed without the new intruder at the specific location $222_{1-3}$ being aware of the presence of drone $202_{1-3}$. Additionally, the capability of drone $202_{1-3}$ to hover around and move within the confines of the specific location $222_{1-3}$ may enable collection of auxiliary surveillance data $206_{1-3}$ that is more comprehensive and reliable compared to data collected by the corresponding surveillance sensor $220_{1-3}$.

Figure 4:
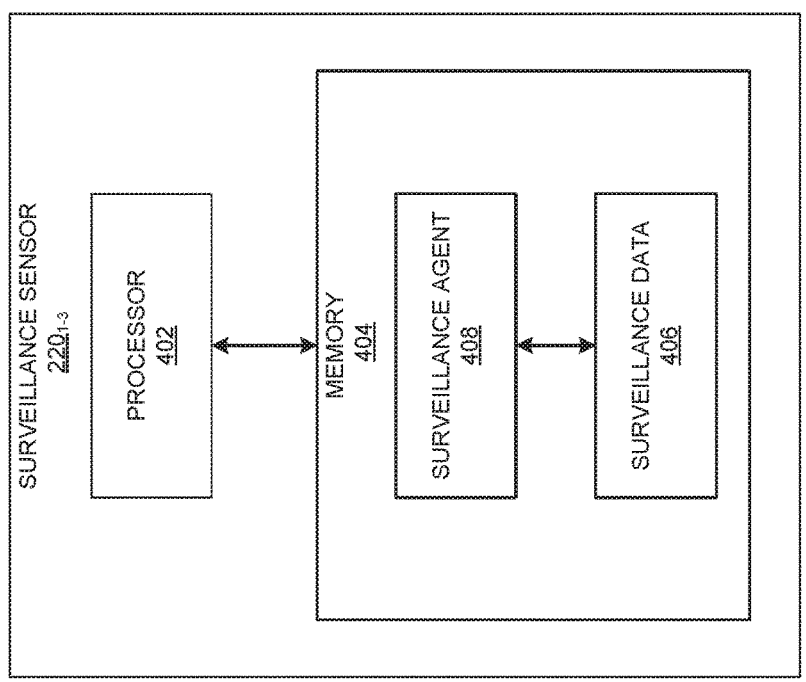
FIG. 4 is a schematic view of a surveillance sensor of the drone based security system of FIG. 2, according to one or more embodiments.

FIG. 4 shows a surveillance sensor $220_{1-3}$, according to one or more embodiments. In one or more embodiments, surveillance sensor $220_{1-3}$ may include a processor 402 communicatively coupled to memory 404. Memory 404 may include surveillance data 406 collected at the specific location $222_{1-3}$; memory 404 may also include a surveillance agent 408 (e.g., a set of software engines and/or modules) executable through processor 402 to generate surveillance data 406 and analyze said generated surveillance data 406 to detect the motion and/or the presence of the new intruder discussed above.

In one or more embodiments, activating a flight plan $110_{1-P}$ on a drone $202_{1-3}$ may involve transmitting (e.g., from server 230, surveillance sensor $220_{1-3}$) a signal to drone $202_{1-3}$ to cause drone $202_{1-3}$ to exit the standby mode thereof at the associated docking station $204_{1-3}$ and enter into an active mode that, in turn, may cause execution of instructions through processor 102 to trigger flight of drone $202_{1-3}$ to the specific location $222_{1-3}$. It should be noted that requisite components such as motors and sensors (e.g., part of sensors $108_{1-N}$) for collision avoidance may be provided in drone $202_{1-3}$.

In one or more embodiments, drone $202_{1-3}$ may transmit (e.g., as a live feed) auxiliary surveillance data $206_{1-3}$ to server 230. In one or more embodiments, server 230 may analyze auxiliary surveillance data $206_{1-3}$ in conjunction with surveillance data 406 or separately to determine whether event $224_{1-3}$ poses a security threat (e.g., robbery, assault, murder, arson, security breach). In one or more embodiments, if yes, server 230 may trigger dispatch of appropriate security personnel based on alerting security server/terminal 280 communicatively coupled to server 230 through computer network 250. Thus, exemplary embodiments discussed herein may enhance the chances of success in controlling security threats and breaches.

Figure 5:
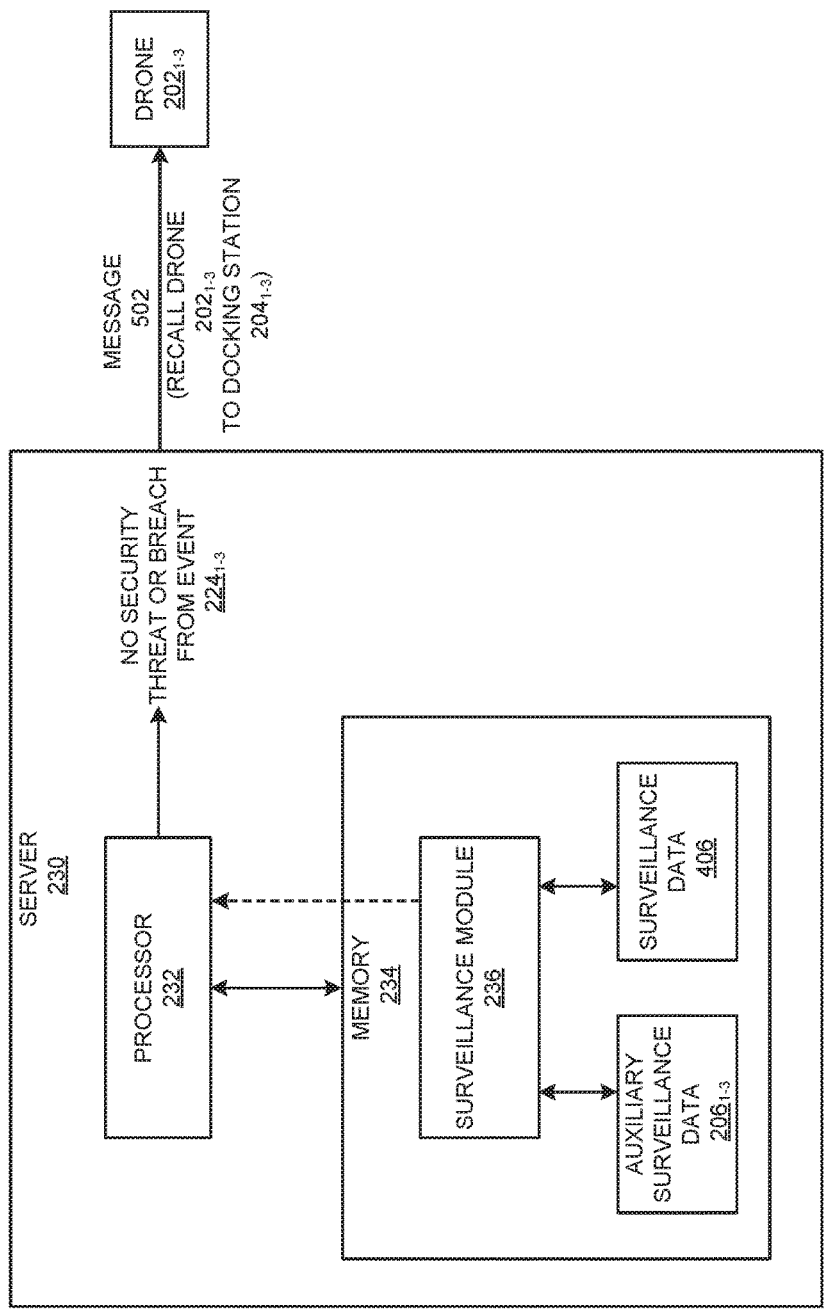
FIG. 5 is a schematic view of determination of an event as not constituting a security threat and/or a security breach through a server of the drone based security system of FIG. 2.

FIG. 5 shows determination of event $224_{1-3}$ as not constituting a security threat and/or a security breach through server 230. Based on the analysis of auxiliary surveillance data $206_{1-3}$ (and, optionally, surveillance data 406), server 230 may, for example, determine that the new intruder discussed above is actually a staff member arriving at the building in a new car to work the graveyard shift. In this case, server 230 may have a reference image of the staff member in memory 234 thereof; based on facial recognition algorithms and/or macroblock/pixel analyses, the new intruder may be determined to be a staff member of the building. Other ways of analyses are within the scope of the exemplary embodiments discussed herein.

In accordance with the determination of the identity of the new intruder, server 230 may interpret event $224_{1-3}$ as not constituting a security threat and/or a security breach. In accordance therewith, server 230 may transmit a message 502 (e.g., a signal) to drone $202_{1-3}$ to recall drone $202_{1-3}$ back to the associated docking station $204_{1-3}$. In one or more embodiments, message 502 may cause a specific portion (e.g., a separate set of subroutines) of flight plan $110_{1-P}$ to be executed to cause drone $202_{1-3}$ to come back to the associated docking station $204_{1-3}$. Alternately, in some embodiments, message 502 may cause another flight plan $110_{1-P}$ associated with the return path to be activated.

It is obvious from the discussion above that detection of event $224_{1-3}$ by a surveillance sensor $220_{1-3}$ may activate the associated drone $202_{1-3}$ either directly from surveillance sensor $220_{1-3}$ or from server 230. As shown in FIG. 2, surveillance sensor $220_1$, drone $202_1$, docking station $204_1$ and event $224_1$ may form a set, surveillance sensor $220_2$, drone $202_2$, docking station $204_2$ and event $224_2$ may form another set, and surveillance sensor $220_3$, drone $202_3$, docking station $204_3$ and event $224_3$ may form yet another set. In response to detection of another event $224_2/224_3$ by surveillance sensor $220_2/220_3$, server 230 or surveillance sensor $220_2/220_3$ may select drone $202_2/202_3$ for dispatch to the corresponding specific location $222_2/222_3$.

In one or more embodiments, when a drone $202_{1-3}$ is unavailable for dispatch to the corresponding specific location $222_{1-3}$ after detection of event $224_{1-3}$ by surveillance sensor $220_{1-3}$ due to factors such as non-communication with server 230/surveillance sensor $220_{1-3}$, inclement weather in the paths associated with flight plan $110_{1-P}$, inclement weather at the corresponding specific location $222_{1-3}$ and low battery 112, server 230 may dispatch another drone $202_{1-3}$ to the specific location $222_{1-3}$. In some alternate embodiments, each surveillance sensor $220_{1-3}$ may be communicatively coupled to every drone $202_{1-3}$ of drone based security system 200 through computer network 250, and may possess the capability to trigger a drone $202_{1-3}$ not primarily associated therewith.

In yet another set of alternate embodiments, server 230/surveillance sensor $220_{1-3}$ may possess the capability to select/activate an alternate flight plan $110_{1-P}$ in case the original flight plan $110_{1-P}$ is rendered unviable due to various factors discussed above. Environmental sensors may be provided in drones $202_{1-3}$ (as part of sensors $108_{1-N}$) and/or specific locations $222_{1-3}$ to determine the aforementioned unviability. For example, an actual drone $202_{1-3}$ to be selected for dispatch may have to travel in rainy weather to the specific location $222_{1-3}$, for which the aforementioned actual drone $202_{1-3}$ may not be the best choice. Here, an alternate waterproof drone $202_{1-3}$ may be selected for dispatch to the specific location $222_{1-3}$. It is quite obvious to see the modifications to the drone-specific location/surveillance sensor mapping in accordance with the discussions above.

Also it is obvious that the locking mechanism discussed above may be deactivated by server 230 upon determination of drone $202_{1-3}$ to be dispatched to the specific location $222_{1-3}$ for the auxiliary surveillance. Further, it should be noted that once drone $202_{1-3}$ is dispatched to the specific location $222_{1-3}$, said drone $202_{1-3}$ may travel outside the area covered by the specific location $222_{1-3}$, if required, to perform the auxiliary surveillance. Flight plan $110_{1-P}$ may be appropriately designed to serve the aforementioned purpose. Additionally, flight plan $110_{1-P}$ may be dynamically modified or edited as required through remotely accessing the exposed APIs $152_{1-M}$.

In the example scenario of detecting the new intruder in the driveway of a building, server 230 may be utilized to monitor multiple points of entry (or, multiple driveways) to the building through surveillance sensors $220_{1-3}$. The number of areas being monitored may vary based on the coverage required. In one or more embodiments, surveillance sensors $220_{1-3}$ may be stationary or limited in movement thereof; therefore, the surveillance provided by surveillance sensors $220_{1-3}$ may merely be "static." Exemplary embodiments discussed herein may extend surveillance capabilities through drones $202_{1-3}$ based on control thereof.

Scenarios discussed above are merely to illustrate functionalities of drone based security system 200. Other scenarios may also entirely be covered through concepts associated with the exemplary embodiments. For example, the motion detection by surveillance sensor $220_{1-3}$ may be interpreted as a false alarm based on the subsequent auxiliary surveillance by drone $202_{1-3}$ and the detection at server 230 that the cause of the motion was an animal. It should also be noted that drone $202_{1-3}$ may be recalled back to docking station $204_{1-3}$ by server 230 after completion of the auxiliary surveillance tasks thereof discussed above and confirmation of the detected security threat and/or the security breach.

In one or more embodiments, server 230 may assess risk associated with the security threat and/or breach analyzed above. Security server 280 discussed above may be associated with multiple forms of security services. In accordance with the level of risk determined at server 230 based on analyzing auxiliary surveillance data $206_{1-3}$ and, optionally, surveillance data 406, the appropriate security service may be availed based on communication with security server 280.

It can be envisioned that drone based security system 200 may be associated with a law enforcement agency (e.g., border patrol). Exemplary embodiments discussed herein may allow for drone based security system 200 to be deployed along a border line of a country. In accordance with the capabilities thereof, drones $202_{1-3}$ may be dispatched across the border line following detection of motion across the border line by surveillance sensors $220_{1-3}$. Auxiliary surveillance data $206_{1-3}$ and, optionally, surveillance data 406, may be analyzed to interpret the motion detected as constituting terrorist infiltration across the border line. Drones $202_{1-3}$ may specifically detect terrorists carrying weapons.

Figure 6:
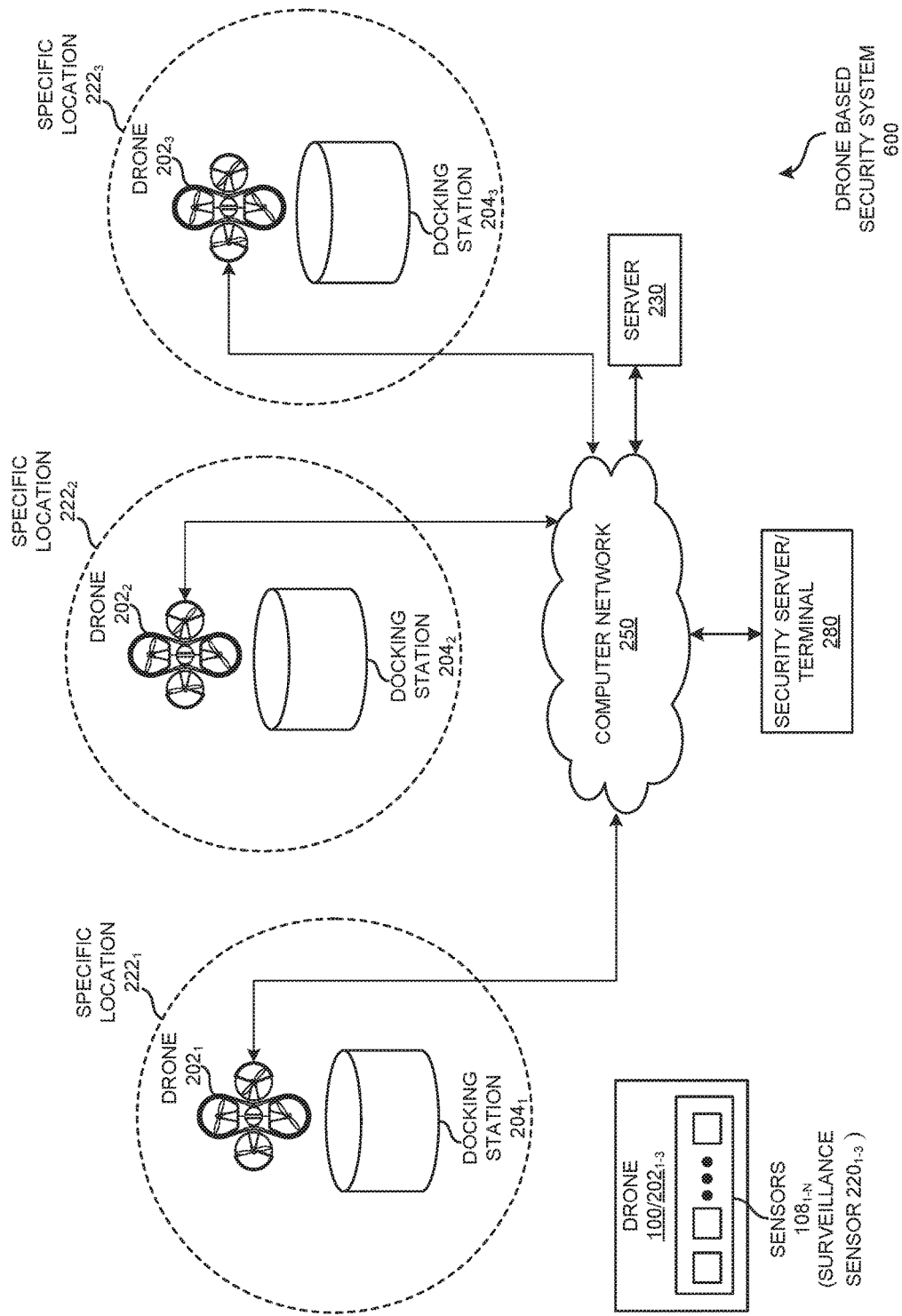
FIG. 6 is a schematic view of another drone based security system, according to one or more embodiments.

FIG. 6 shows another drone based security system 600, according to one or more embodiments. Here, in one or more embodiments, drones $202_{1-3}$ and the corresponding docking stations $204_{1-3}$ are directly related to specific locations $222_{1-3}$ discussed above. In other words, in one or more embodiments, sensors $108_{1-N}$ of each drone $202_{1-3}$ may enable surveillance of the corresponding specific location $222_{1-3}$; surveillance sensor $220_{1-3}$ corresponding to each drone $202_{1-3}$ may be considered as part of sensors $108_{1-N}$ thereof. In one or more embodiments, each drone $202_{1-3}$ may detect event $224_{1-3}$, based on which server 230 selects a relevant flight plan $110_{1-P}$. In one or more embodiments, the selection of flight plan $110_{1-P}$ may cause drone $202_{1-3}$ to take flight and perform non-invasive surveillance of the specific location $222_{1-3}$ in detail and, if required, travel outside the specific location $222_{1-3}$ to track the new intruder discussed above.

All scenarios and functionalities provided through drone based security system 200 are also applicable to drone based security system 600. Sensors $108_{1-N}$/surveillance sensor $220_{1-3}$, in conjunction with processor 102/232 may sense a change in a characteristic (e.g., radiation amplitude, heat intensity, pixels/macroblocks) of an environment of the specific location $222_{1-3}$ based on analyzing surveillance data 406/auxiliary surveillance data $206_{1-3}$ collected at the specific location $222_{1-3}$. The aforementioned sensing may result in the dispatch of a relevant drone $202_{1-3}$ to the specific location $222_{1-3}$.

A drone $202_{1-3}$, as discussed above, may be an unmanned aerial vehicle without a human pilot aboard. Drone $202_{1-3}$ may be controlled by various kinds of autonomy. In some preferred embodiments, drone $202_{1-3}$ is fully autonomous and controlled by onboard computers (e.g., with processor 102, memory 104 and sensors $108_{1-N}$). According to various other embodiments, drone $202_{1-3}$ may be controlled to a certain degree remotely by an operator at another location (e.g., at a location of server 230).

It should be noted that while drones $202_{1-3}$ are preferably within the range of computer network 250 (e.g., a LAN; drones $202_{1-3}$ may be coupled to computer network 250 through WiFi®), said drones $202_{1-3}$ may also be far away from computer network 250 but still coupled to computer network 250 (e.g., the LAN) through range extenders (e.g., WiFi® extenders). Also, it should be noted that artificial intelligence (AI) algorithm(s) may be employed at server 230 to aid decision making (e.g., with respect to configuration of drone 100/$202_{1-3}$, setting up flight plans $110_{1-P}$, event $224_{1-3}$ detection, risk determination and more). Last but not the least, it should also be noted that server 230 may be one server (e.g., a video management server) or a network of interconnected servers.

Figure 7:
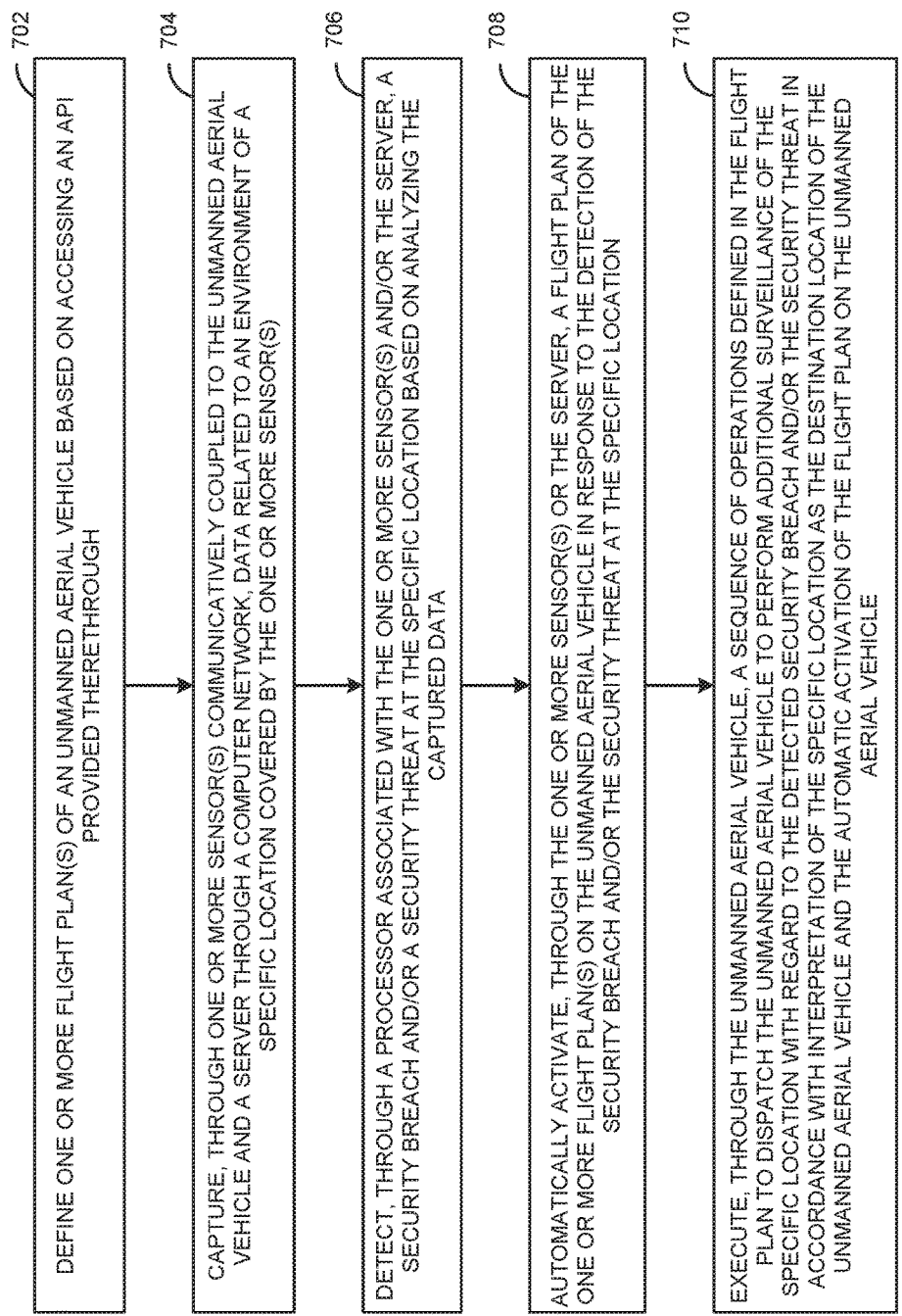
FIG. 7 is a process flow diagram detailing the operations involved in an unmanned aerial vehicle based security system, according to one or more embodiments.

FIG. 7 shows a process flow diagram detailing the operations involved in an unmanned aerial vehicle based security system (e.g., drone based security system 200, drone based security system 600), according to one or more embodiments. In one or more embodiments, operation 702 may involve defining one or more flight plan(s) (e.g., flight plans $110_{1-P}$) of an unmanned aerial vehicle (e.g., drone $202_{1-3}$) from a rest location (e.g., docking station $204_{1-3}$) to a destination location within a memory (e.g., memory 104) of the unmanned aerial vehicle based on accessing an API (e.g., API $152_{1-M}$) exposed through a programming toolkit (e.g., application development kit 150) executing on a processor (e.g., processor 102) of the unmanned aerial vehicle.

In one or more embodiments, a flight plan of the one or more flight plan(s) may be a sequence of operations to be performed by the unmanned aerial vehicle as part of dispatch thereof to the destination location. In one or more embodiments, operation 704 may involve capturing, through one or more sensor(s) (e.g., surveillance sensor $220_{1-3}$, sensors $108_{1-N}$) communicatively coupled to the unmanned aerial vehicle and a server (e.g., server 230) through a computer network (e.g., computer network 250), data (e.g., data 106, surveillance data 406) related to an environment of a specific location (e.g., specific location $222_{1-3}$) covered by the one or more sensor(s). In one or more embodiments, the server may be at a location remote from the one or more sensor(s).

In one or more embodiments, operation 706 may involve detecting, through a processor (e.g., processor 102, processor 402, processor 232) associated with the one or more sensor(s) and the server, a security breach and/or a security threat at the specific location based on analyzing the captured data. In one or more embodiments, operation 708 may involve automatically activating, through the one or more sensor(s) or the server, the flight plan of the one or more flight plan(s) on the unmanned aerial vehicle in response to the detection of the security breach and/or the security threat at the specific location.

In one or more embodiments, operation 710 may then involve executing, through the unmanned aerial vehicle, the sequence of operations defined in the flight plan to dispatch the unmanned aerial vehicle to perform additional surveillance of the specific location with regard to the detected security breach and/or the security threat in accordance with interpretation of the specific location as the destination location of the unmanned aerial vehicle and the automatic activation of the flight plan on the unmanned aerial vehicle.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a non-transitory machine-readable medium (e.g., a Compact Disc (CD), a Digital Video Disc (DVD), a Blu-ray Disc™, a hard disk/drive) and/or a machine accessible medium compatible with a data processing system (e.g., server 230, drones 202$_{1-3}$, surveillance sensors 220$_{1-3}$, drone based security system 200, drone based security system 600), and may be performed in any order (e.g., including using means for achieving the various operations). Accordingly, the specification and drawings are to be regarded in an illustrative rather than a restrictive sense.

What is claimed:

1. A method comprising:
    defining at least one flight plan of an unmanned aerial vehicle from a rest location thereof to a destination location within a memory of the unmanned aerial vehicle based on accessing an Application Programming Interface (API) exposed through a programming toolkit executing on a processor of the unmanned aerial vehicle, a flight plan of the at least one flight plan being a sequence of operations to be performed by the unmanned aerial vehicle as part of dispatch thereof to the destination location;
    capturing, through at least one sensor communicatively coupled to the unmanned aerial vehicle and a server through a computer network, data related to an environment of a specific location covered by the at least one sensor, the server being at a location remote from the at least one sensor;
    detecting, through a processor associated with at least one of: the at least one sensor and the server, at least one of: a security breach and a security threat at the specific location based on analyzing the captured data;
    automatically activating, through one of: the at least one sensor and the server, the flight plan of the at least one flight plan on the unmanned aerial vehicle in response to the detection of the at least one of: the security breach and the security threat at the specific location; and
    executing, through the unmanned aerial vehicle, the sequence of operations defined in the flight plan to dispatch the unmanned aerial vehicle to perform additional surveillance of the specific location with regard to the detected at least one of: the security breach and the security threat in accordance with interpretation of the specific location as the destination location of the unmanned aerial vehicle and the automatic activation of the flight plan on the unmanned aerial vehicle.

2. The method of claim 1, wherein, in accordance with the at least one sensor being a surveillance sensor at the specific location, the method comprises:
    capturing, through the surveillance sensor communicatively coupled to the unmanned aerial vehicle and the server through the computer network, the data related to the environment of the specific location covered by the surveillance sensor;
    automatically activating, through the one of: the surveillance sensor and the server, the flight plan of the at least one flight plan on the unmanned aerial vehicle in response to the detection of the at least one of: the security breach and the security threat at the specific location; and
    performing, through the unmanned aerial vehicle, the additional surveillance of the specific location utilizing a second at least one sensor of the unmanned aerial vehicle.

3. The method of claim 1, wherein, in accordance with the at least one sensor being part of the unmanned aerial vehicle, the method comprises capturing, through the unmanned aerial vehicle, the data related to the environment of the specific location of the unmanned aerial vehicle.

4. The method of claim 1, further comprising:
    recalling, through the server, the unmanned aerial vehicle back to the rest location thereof following at least one of:
        interpreting, through the server, the detected at least one of: the security breach and the security threat as a false threat based on the additional surveillance performed by the unmanned aerial vehicle, and
        confirming, through the server, the detected at least one of: the security breach and the security threat based on the additional surveillance performed by the unmanned aerial vehicle.

5. The method of claim 4, further comprising:
    alerting, through the server, a security server communicatively coupled to the server through the computer network of the detected at least one of: the security breach and the security threat at the specific location.

6. The method of claim 1, further comprising at least one of:
    automatically activating, through the server, another flight plan of the at least one flight plan on the unmanned aerial vehicle based on determining, at the server, that paths of the unmanned aerial vehicle covered in the flight plan are untraversable by the unmanned aerial vehicle; and
    automatically dispatching, through the server, another unmanned aerial vehicle to the specific location following the detection of the at least one of: the security breach and the security threat thereat based on determining non-availability of the unmanned aerial vehicle for the additional surveillance.

7. The method of claim 1, further comprising:
    dynamically modifying, through the server, the flight plan of the at least one flight plan to enable the unmanned aerial vehicle go beyond the specific location for the additional surveillance.

8. A server comprising:
    a memory; and
    a processor communicatively coupled to the memory, the processor being configured to execute instructions to:
        define at least one flight plan of an unmanned aerial vehicle from a rest location thereof to a destination location within a memory of the unmanned aerial vehicle based on accessing an API exposed through a programming toolkit executing on a processor of the unmanned aerial vehicle, a flight plan of the at least one flight plan being a sequence of operations to be performed by the unmanned aerial vehicle as part of dispatch thereof to the destination location,
        detect at least one of: a security breach and a security threat at a specific location based on analyzing data captured through at least one sensor communicatively coupled to the unmanned aerial vehicle and the server through a computer network, the captured data being related to an environment of the specific location covered by the at least one sensor, and the server being at a location remote from the at least one sensor;
        automatically activate the flight plan of the at least one flight plan on the unmanned aerial vehicle in response to the detection of the at least one of: the security breach and the security threat at the specific location, and dispatch the unmanned aerial vehicle to the specific location to perform additional surveillance thereat with regard to the detected at least one of: the security breach and the security threat based on execution of the flight plan on the unmanned aerial vehicle in accordance with interpretation of the specific location as the destination location of the unmanned aerial vehicle and the automatic activation of the flight plan on the unmanned aerial vehicle.

9. The server of claim 8, wherein the processor is configured to execute instructions to detect at least the one of: the security breach and the security threat at the specific location based on analyzing the data captured through the at least one sensor to determine motion at the specific location.

10. The server of claim 8, wherein the processor is further configured to execute instructions to:
recall the unmanned aerial vehicle back to the rest location thereof following at least one of:
interpreting the detected at least one of: the security breach and the security threat as a false threat based on the additional surveillance performed by the unmanned aerial vehicle, and
confirming the detected at least one of: the security breach and the security threat based on the additional surveillance performed by the unmanned aerial vehicle.

11. The server of claim 10, wherein the processor is further configured to execute instructions to:
alert a security server communicatively coupled to the server through the computer network of the detected at least one of: the security breach and the security threat at the specific location.

12. The server of claim 8, wherein the processor is further configured to execute instructions to at least one of:
automatically activate another flight plan of the at least one flight plan on the unmanned aerial vehicle based on determining that paths of the unmanned aerial vehicle covered in the flight plan are untraversable by the unmanned aerial vehicle, and
automatically dispatch another unmanned aerial vehicle to the specific location following the detection of the at least one of: the security breach and the security threat thereat based on determining non-availability of the unmanned aerial vehicle for the additional surveillance.

13. The server of claim 8, wherein the processor is further configured to execute instructions to:
dynamically modify the flight plan of the at least one flight plan to enable the unmanned aerial vehicle go beyond the specific location for the additional surveillance.

14. A system comprising:
an unmanned aerial vehicle having at least one flight plan from a rest location thereof to a destination location defined within a memory of the unmanned aerial vehicle based on access to an API exposed through a programming toolkit executing on a processor of the unmanned aerial vehicle, a flight plan of the at least one flight plan being a sequence of operations to be performed by the unmanned aerial vehicle as part of dispatch thereof to the destination location;
a server;
at least one sensor communicatively coupled to the unmanned aerial vehicle and the server through a computer network to capture data related to an environment of a specific location covered by the at least one sensor, the server being at a location remote from the at least one sensor; and
a processor associated with at least one of: the at least one sensor and the server to detect at least one of: a security breach and a security threat at the specific location based on analyzing the captured data,
wherein one of: the at least one sensor and the server is configured to automatically activate the flight plan of the at least one flight plan on the unmanned aerial vehicle in response to the detection of the at least one of: the security breach and the security threat at the specific location, and
wherein the unmanned aerial vehicle is configured to execute the sequence of operations defined in the flight plan to dispatch the unmanned aerial vehicle to perform additional surveillance of the specific location with regard to the detected at least one of: the security breach and the security threat in accordance with interpretation of the specific location as the destination location of the unmanned aerial vehicle and the automatic activation of the flight plan on the unmanned aerial vehicle.

15. The system of claim 14, wherein, in accordance with the at least one sensor being a surveillance sensor at the specific location:
the surveillance sensor communicatively coupled to the unmanned aerial vehicle and the server through the computer network is configured to capture the data related to the environment of the specific location covered by the surveillance sensor,
the one of: the surveillance sensor and the server is configured to automatically activate the flight plan of the at least one flight plan on the unmanned aerial vehicle in response to the detection of the at least one of: the security breach and the security threat at the specific location, and
the unmanned aerial vehicle is configured to perform the additional surveillance of the specific location utilizing a second at least one sensor of the unmanned aerial vehicle.

16. The system of claim 14, wherein, in accordance with the at least one sensor being part of the unmanned aerial vehicle, the unmanned aerial vehicle is configured to capture the data related to the environment of the specific location of the unmanned aerial vehicle.

17. The system of claim 14, wherein:
the server is further configured to recall the unmanned aerial vehicle back to the rest location thereof following at least one of:
interpreting the detected at least one of: the security breach and the security threat as a false threat based on the additional surveillance performed by the unmanned aerial vehicle, and
confirming the detected at least one of: the security breach and the security threat based on the additional surveillance performed by the unmanned aerial vehicle.

18. The system of claim 17, wherein:
the server is further configured to alert a security server communicatively coupled to the server through the computer network of the detected at least one of: the security breach and the security threat at the specific location.

19. The system of claim 14, wherein the server is further configured to at least one of:

automatically activate another flight plan of the at least one flight plan on the unmanned aerial vehicle based on determining that paths of the unmanned aerial vehicle covered in the flight plan are untraversable by the unmanned aerial vehicle, and automatically dispatch another unmanned aerial vehicle to the specific location following the detection of the at least one of: the security breach and the security threat thereat based on determining non-availability of the unmanned aerial vehicle for the additional surveillance.

20. The system of claim 14, wherein:

the server is further configured to dynamically modify the flight plan of the at least one flight plan to enable the unmanned aerial vehicle go beyond the specific location for the additional surveillance.

* * * * *